Figure 4:
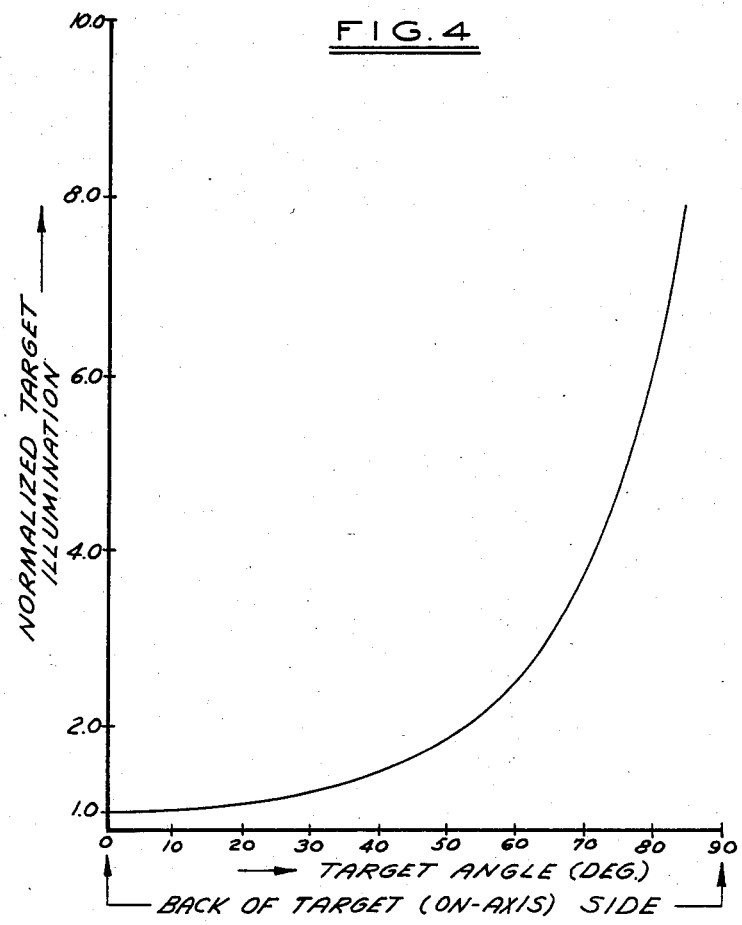

United States Patent [19]
Thomas

[11] Patent Number: 4,657,721
[45] Date of Patent: Apr. 14, 1987

[54] TARGET ILLUMINATION

[75] Inventor: Carlton E. Thomas, Ann Arbor, Mich.

[73] Assignee: KMS Fusion, Inc., Ann Arbor, Mich.

[21] Appl. No.: 972,504

[22] Filed: Dec. 22, 1978

Related U.S. Application Data

[63] Continuation of Ser. No. 365,092, May 21, 1973, abandoned.

[51] Int. Cl.⁴ .............................................. G21B 1/00
[52] U.S. Cl. ..................................... 376/104; 350/619
[58] Field of Search ...................... 176/1; 350/55, 299, 350/442, 443, 294, 619; 376/103, 104; 300/294

[56] References Cited

U.S. PATENT DOCUMENTS

| | | | |
|---|---|---|---|
| 2,380,887 | 7/1945 | Warmisham | 300/200 |
| 2,463,569 | 3/1949 | Smith | |
| 3,001,055 | 9/1961 | Lozier et al. | 350/294 |
| 3,164,781 | 1/1965 | Goldberg | |
| 3,414,835 | 12/1968 | Miller | |
| 3,652,393 | 3/1972 | Kaiser et al. | 176/1 |
| 3,827,059 | 7/1974 | Rambauske | 176/1 |
| 4,003,639 | 1/1977 | McFarland et al. | |
| 4,084,887 | 4/1978 | Sigler | 176/1 |

FOREIGN PATENT DOCUMENTS 501294 7/1930 Fed. Rep. of Germany .
1195602 6/1970 United Kingdom .................... 176/1

OTHER PUBLICATIONS

Soviet J. of Optical Technology, vol. 35, No. 3, 1968, pp. 355-358, Puryayev.
Applied Optics, vol. 10, No. 7, pp. 1609-1614, 7/71, Metz.
AIAA 11th Aerospace Sciences Meeting, Wash. D.C., 1/73, "Review of Controlled Fusion Research Using Laser Heating", FIG. 1, Hertzberg.

Primary Examiner—Harvey E. Behrend
Attorney, Agent, or Firm—Barnes, Kisselle, Raisch, Choate, Whittemore & Hulbert

[57] ABSTRACT

A system for illuminating a tiny target of fusion fuel with energy from a laser source to achieve uniform surface heat leading to fusion including a laser light source with a beam splitter to provide two laser beams directed to a common target point and a pair of identical ellipsoidal mirrors facing each other concavely and positioned to have a common reflective focal point, the mirrors each being coaxially and centrally apertured to pass respective laser beams to the other and opposed mirrors of said pair wherein reflected energy will be directed normal to and distributed around the surface of a spherical target located at the common spherical focus.

13 Claims, 6 Drawing Figures

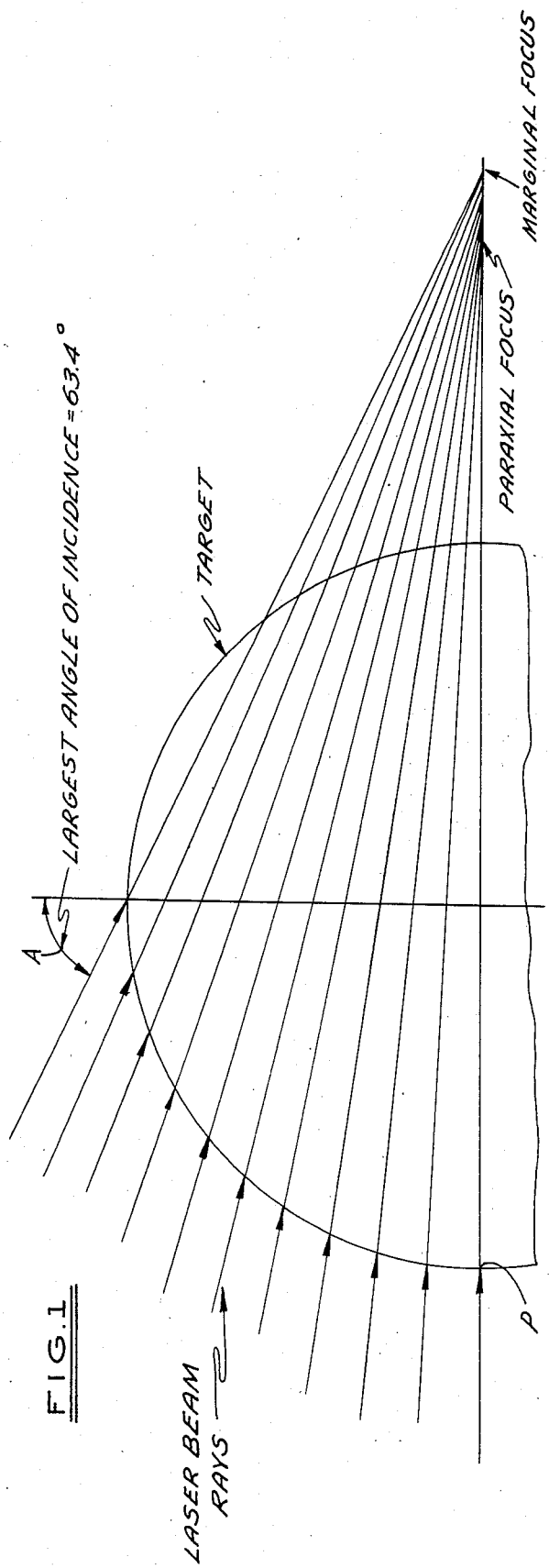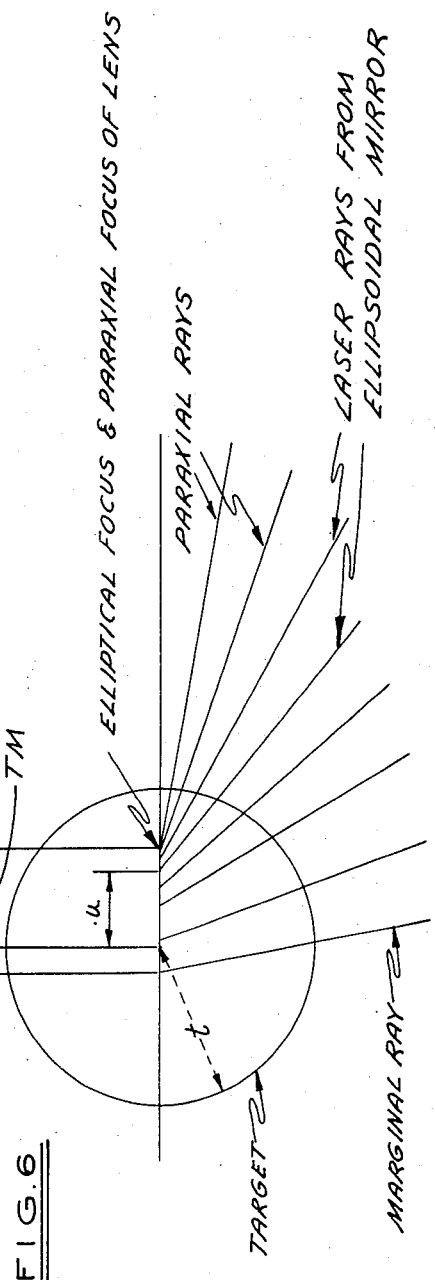

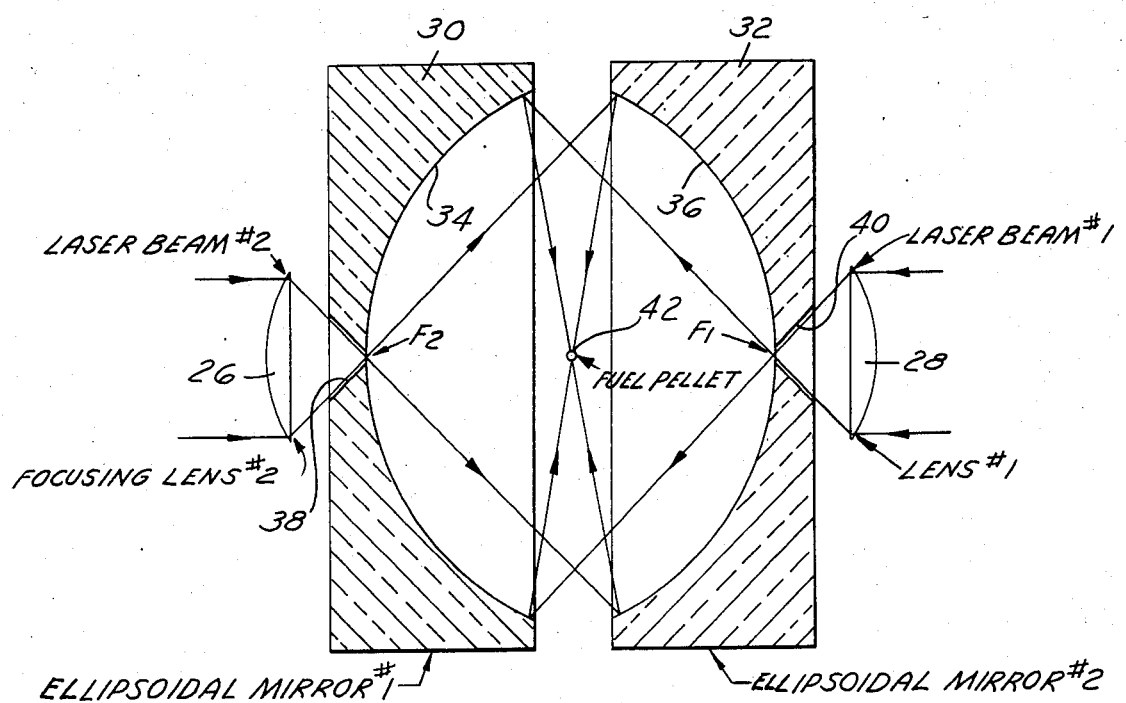
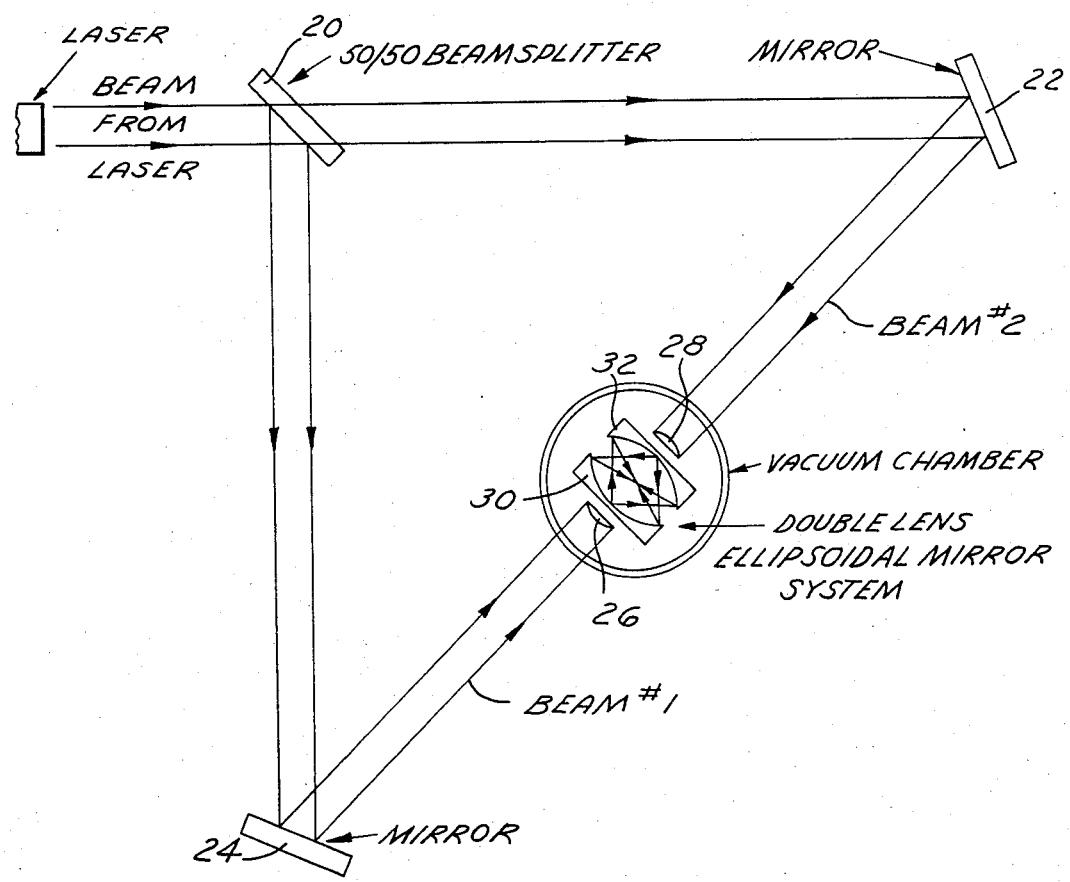

TARGET ILLUMINATION

This is a continuation of application Ser. No. 365,092 filed May 21, 1973, now abandoned.

This invention relates to Target Illumination and more particularly to an apparatus and method for illuminating fuel configurations with a laser energy source.

There have been recent publications regarding the use of laser radiation in the illumination of fuel pellets for the purpose of achieving nuclear fusion. Disclosures which illustrate this type of illumination are found in the following U.S. patents:

U.S. Pat. No. 3,378,466; Apr. 16, 1968; Whittlesley
U.S. Pat. No. 3,489,645; Jan. 13, 1970; Daiber et al.

It is recognized that in order to achieve controlled thermonuclear reaction by the laser heating of fuel pellets, it is desirable that the laser radiation be delivered uniformly to the pellet. The laser not only heats this pellet, but, to produce useful fusion energy, it must increase the pellet density by orders of magnitude to cause an implosion. Any system which focuses the laser energy on to the pellet should provide uniform illumination on all sides to keep the implosion stable. For a spherical pellet, this implies uniform and orthogonal radiation over the entire surface of the sphere.

It is believed that laser fusion experiments reported to the present time have utilized simple lenses to focus the laser beam on to the target. One project of the U.S.S.R. has utilized nine parallel channels and nine lenses surrounding the target to approximate symmetrical illumination as reported in an article by H. G. Basov entitled "Heating of Laser Plasmas for Thermonuclear Fusion," presented at the Second Workshop on Laser Interaction and Related Plasma Phenomena, Rensselaer Polytechnic Institute, Aug. 30, 1971.

Any lens that is used in target illumination can illuminate only part of a spherical pellet. A simple lens system provides a non-uniform irradiance even over the relatively small illuminated portion of a spherical pellet which is centered on the lens focus. The radiation pattern can be improved for most lenses by moving the target away from the focus toward the lens and aspheric corrector plates can provide uniform radiation if the variations in pellet absorptivity with the angle of incidence are ignored.

However, even with this type of illumination, the radiation strikes the pellet at grossly non-orthogonal angles and since the amount of laser energy actually absorbed decreases with increased angle of incidence, the net effect is to cause a non-uniform distribution of absorbed energy. While multiple lens system tend to improve this illumination, there are still many practical problems remaining which lead to implosion instabilities.

It is an object of the present invention to provide a target illumination apparatus and method which greatly improve the efficiency of the laser source and which makes it possible to have the energy reach the pellet from all sides in substantially orthogonal angles around the complete surface.

It is a further object of the invention to provide a radiation of a fuel pellet from a single laser source without the need of a multiplicity (such as six to nine) of mirror-lens channels surrounding the fuel chamber.

Other objects and features of the invention relating to details of construction and operation will be found in the following description and claims in which the principles of the invention are set forth together with the use in connection with the best mode presently contemplated for the practice of the invention.

DRAWINGS accompany the disclosure and the various views thereof may be briefly described as:

FIG. 1, a view of target illumination utilizing a single focus point showing the problem in obtaining orthogonal illumination.

FIG. 2, a sectional view of an optical system for achieving illumination in accordance with the present invention.

FIG. 3, an enlarged view illustrating the entire system utilizing a single laser source.

FIG. 4, a graph showing the relationship of the target angle to the normalized target illumination without corrector plates.

Figure 5:
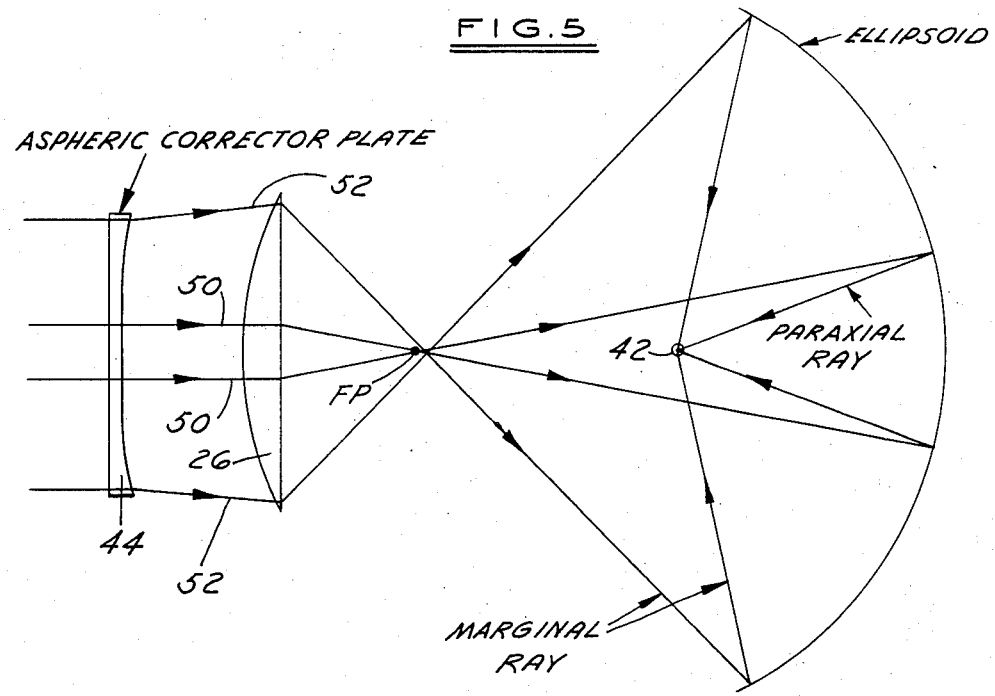

FIG. 5, an illumination of an optical system utilizing an aspheric corrector plate.

FIG. 6, an illustration of target illumination utilizing an over-corrected spherical aberration.

With reference to FIG. 1, exposure of a spherical target by a laser beam utilizing an aspheric corrector plate is illustrated. The paraxial focus point is illustrated in the drawing and the marginal focus point is shown to the right of this. The ray traces in the vicinity of the target for relatively uniform illumination of the hemisphere are shown from a single f/1.0 lens together with an aspheric corrector plate.

It will be noted that the beam coming from the left of the drawing has only one point P toward the center where it is clearly orthogonal to the surface. The largest angle A of incidence from the outside is 63.4°. As previously pointed out, since the amount of energy actually absorbed decreases with the increased angle of incidence, the net effect is to cause a non-uniform distribution of absorbed energy.

The main embodiment of the present invention is illustrated in FIG. 2 wherein two laser beams #1 and #2 of equal intensity are directed toward an apparatus from the left and from the right. The manner of accomplishing this is illustrated in FIG. 3 wherein a single laser beam meets a beam splitter 20 and divides to two angled mirrors 22 and 24. Each beam passes through a lens to focus the laser beam to a small spot. The beam from the left passes through lens 26; the beam from the right passes through lens 28.

As shown best in FIG. 2, there are two reflective, concave ellipsoidal surfaces 34 and 36 facing each other. These surfaces or mirrors are formed in a body shown in cross-section and may be formed of glass with the ellipsoidal surfaces ground in or they may be formed of aluminum with the ellipsoidal surfaces polished to high reflectivity. Each ellipsoidal mirror is provided with respective central conical openings 38 and 40 which terminate in a small opening at the small end directly at the surface of each mirror. Each beam then passes through these openings and expands to reflect from the opposite and facing ellipsoidal mirror. These mirrors are each characterized by two focal points. Light image to one focus will be concentrated at the second focus after reflecting from the mirror surface.

In the system shown in FIG. 2, one focus of each ellipsoidal mirror is placed coincident with the focus of the opposite lens at the points $F_1$ and $F_2$. The other two foci of each mirror are coincident at the center of the system between the mirrors where a pellet 42 will be located. After reflection from the mirrors, all the light is focused on to the pellet. One lens 26 and the ellipsoidal mirror combination illuminates one-half of one hemisphere of the pellet while the other lens 28 with a corresponding mirror combination illuminates the other hemisphere of the pellet.

While the optical system shown in FIGS. 2 and 3 clearly illuminates all of the pellet, it can be shown that the illumination is not exactly uniform. The laser irradiance as seen from the pellet is plotted as a function of angle from the back of the spherical pellet as illustrated in FIG. 4. It will be seen that the curve assumes uniform laser energy across the beam coming into the lens and the sides of the pellet receive much more total laser energy than the front or back. Thus, this variance in uniformity of irradiance is apt to cause instabilities in the pellet implosion. Accordingly, a third optical component in the form of an aspheric corrector plate is added to each optical channel of FIG. 2 as illustrated in FIG. 5.

One side of the system is shown with an aspheric corrector plate 44 and a similar plate would be placed on the other side. This plate is designed to redirect the laser rays to achieve uniform irradiance as illustrated by the diagrammatic ray lines. In addition, the pellet is moved away from the ellipsoidal focus by a fraction of its own diameter and at the same time the two mirrors 30 and 32 are separated by twice this fractional distance to achieve equal illumination patterns on both hemispheres.

It will be appreciated that many different types of corrector plates can be designed to optimize various aspects of the complex hydrodynamic system involved with a laser driven fusion reaction. For example, the laser pulse, although normally very short in duration (on the order of $10^{-9}$ seconds), sees a different optical pattern in the vicinity of the pellet at different times during the laser pulse. More specifically, the laser energy early in the pulse ionizes part of the pellet producing a plasma around the pellet. This plasma expands in a cloud around the pellet and alters the optical characteristics seen by the later arriving laser energy. These later rays, although initially directed to a uniform pellet distribution, may be refracted toward other parts of the pellet causing an imbalance in absorbed energy. Thus, the exact design of the corrector plates is directed to optimizing the entire dynamic implosion event.

In FIG. 5, a simplified example of a corrector plate design is shown. This design ignores any refraction in the plasma blow-off region and therefore optimizes pellet energy absorption only for the early parts of the laser pulse.

The basic approach is a two-step process. First, the pellet is moved forward with respect to the elliptical focus as shown in FIG. 5. It will be appreciated that only one lens mirror combination is shown but in practice, both optical channels would be identical. Moving the pellet forward a distance TM as viewed in FIGS. 5 and 6 increases the energy density at the back where it is very weak as illustrated by the curve in FIG. 4. However, this pellet movement leaves an annular area around the side completely dark.

The aspheric corrector plate 44 is, therefore, added as illustrated in FIG. 5. This plate does not alter the paraxial rays significantly, that is, the rays 50 which are on or near the optical axis. However, the plate does redirect the marginal rays 52 toward the sides of the target. To put it another way, in classical optical terms, this plate over-corrects for spherical aberration by directing the marginal rays behind the lens focal point FP. These rays, for a simple spherical lens, tend to converge in front of the paraxial lens focal point FP. This is known as spherical aberration.

The exact form of the corrector plate is chosen mathematically to map equal energy areas of the incoming laser beam on to equal areas on the pellet. Ray trace in the vicinity of the pellet as a result of this optimization procedure is shown in FIG. 6. Only one quadrant is shown, but the same ray pattern is produced in all four quadrants of the pellet. It will be seen that the entire pellet is uniformly illuminated and the laser rays strike the target at nearly orthogonal incidence.

The degree of aberration in the vicinity of the pellet (FIG. 6) for this case is given by $$\frac{u}{t} = 1 - k + \frac{\sqrt{2-k}}{4}(3\sqrt{k+4F^2} - 10F)$$

where
u = the longitudinal aberration at the pellet focus, measured from the center of the pellet (see FIG. 6)
t = the pellet radius
k = $(r/R)^2$
r = the radius of a ray from the optical axis in the incoming laser beam
R = the radius of the incoming laser beam
F = effective f-number of the focusing lens
F = (f/2 R) and
f = focal length of the focusing lens Note that a different corrector plate is theoretically required for each pellet size, t. The aberration, u, is mathematically converted into a surface formula for the corrector plate by conventional ray tracing techniques.

I claim:

1. In a system for illuminating a minute target with a laser energy source to achieve fusion conditions that improvement which comprises:
a pair of concave ellipsoidal mirrors positioned in opposed relation and spaced to have a common reflective focal point, said mirrors each having a central aperture on a common axis including said focal point to admit a laser beam through the back of each toward the reflective surface of the other with a second focal point of each said ellipsoidal mirror being disposed on said axis adjacent the said aperture in the opposing mirror, and an optical system positioned at each of said apertures on axis with said focal point having the optical function of focusing a laser beam entering on said common axis at the second focal point of the opposing ellipsoidal mirror.

2. A system as defined in claim 1 in which each of said second focal points is positioned on the line of curvature of the opposing reflective surface.

3. A system as defined in claim 2 in which said optical system includes a focusing lens.

4. A system as defined in claim 1 in which said optical system includes a focusing lens, and an aspheric lens to direct marginal rays of a laser beam behind the normal focal point of the focusing lens.

5. A system as defined in claim 1 in which said optical system is positioned at each of said apertures to direct the laser beam in rays toward a target at the common reflective focal point to achieve optimum target absorptivity at a predetermined phase of implosion.

6. A system for illuminating a minute spherical target with a laser energy source to achieve fusion conditions which comprises:
 (a) a pair of concave ellipsoidal mirrors positioned in opposed relation and spaced to have a substantially common focal point at a target position, said mirrors each having a central aperture on a common axis including said focal point to admit a laser beam through the back of each toward the reflective surface of the other, and
 (b) a lens system in each said beam to focus the reflected paraxial rays of said beam into a spherical target on said axis and to direct marginal rays of said beam to the surface of said target in a direction substantially normal thereto to achieve uniform illumination of the target.

7. A system as defined in claim 6 in which said lens system comprises a focusing lens to focus paraxial rays to a normal focus point on said common axis prior to divergence to a reflective surface, and an aspheric lens to direct marginal rays behind said normal focus point prior to divergence to a reflective surface.

8. A system for illuminating a minute target with laser energy to achieve uniform illumination resulting in fusion conditions which comprises:
 (a) a laser beam source,
 (b) a beam splitter to divide the beam into two beams orthogonally disposed relative to each other,
 (c) a pair of beam reflectors positioned in each of said beams to direct said beams toward each other on a common axis,
 (d) a pair of ellipsoidal mirrors positioned on said common axis having a common reflective focal point and apertured to admit each said beam from the rear of the ellipsoidal surface, and
 (e) a lens system in each said beam to focus each beam at a point in the lines of surface of a respective ellipsoidal mirror at said respective apertures.

9. A system as defined in claim 8 in which said lens system includes lenses to focus marginal rays at a different focal point than paraxial rays to achieve optimum uniform target illumination.

10. A method of illuminating a minute target with laser energy to achieve uniform illumination resulting in fusion conditions which comprises:
 (a) directing laser beams simultaneously toward a spherical target from opposed directions on a common axis, each to illuminate a hemisphere of the target facing in the direction of the opposing beam,
 (b) reflecting each of said beams toward a common focal point on said common axis from an ellipsoidal mirror having a concave reflective surface opposing the associated said hemisphere, and
 (c) positioning a spherical target of fusion fuel at said common focal point.

11. A method of illuminating a minute target with laser energy to achieve uniform illumination resulting in fusion conditions which comprises:
 (a) directing a laser beam simultaneously toward a spherical target from opposed direction to illuminated opposite hemispheres of the target,
 (b) reflecting each of said beams from an ellipsoidal mirror toward a common focal point,
 (c) positioning a spherical target of fusion fuel at said common focal point, and
 (d) modifying said beams respectively to vary the marginal ray focus from the paraxial ray focus to achieve optimum target absorptivity at a predetermined phase of implosion.

12. In an optical system for illuminating a target region, the improvement comprising a pair of concave ellipsoidal reflectors positioned in opposed relation on a system axis to form a target cavity, each said reflector having a central opening on said axis to admit a laser beam, a near first focal point disposed on said axis in substantial coincidence with the near first focal point of the opposing reflector at a target region within said cavity and a remote second focal point disposed on said axis adjacent the said central opening of the opposing reflector.

13. In an optical system of the type for illuminating a target and including means for directing first and second collimated beams of electromagnetic energy generally toward said target and means disposed on a system axis and adapted to focus said collimated beams over the surface area of said target from a direction at all points substantially orthogonal thereto, the improvement wherein said focusing means comprises first and second opposed, centrally apertured reflective means coaxially disposed on said system axis, said first and second reflective means each having a first focus disposed at said target and a second focus disposed in proximity to the said central aperture in the opposing reflective means, and third and fourth means respectively disposed on said system axis externally of said first and second reflective means in the path of a corresponding collimated beam to focus each said collimated beam through a corresponding aperture in the adjacent reflective means substantially to the said second focus of the opposing reflective means.

* * * * *